Dec. 1, 1931. G. RAYMOND 1,834,180
SPRAY EXTRACTOR
Filed Dec. 9, 1929
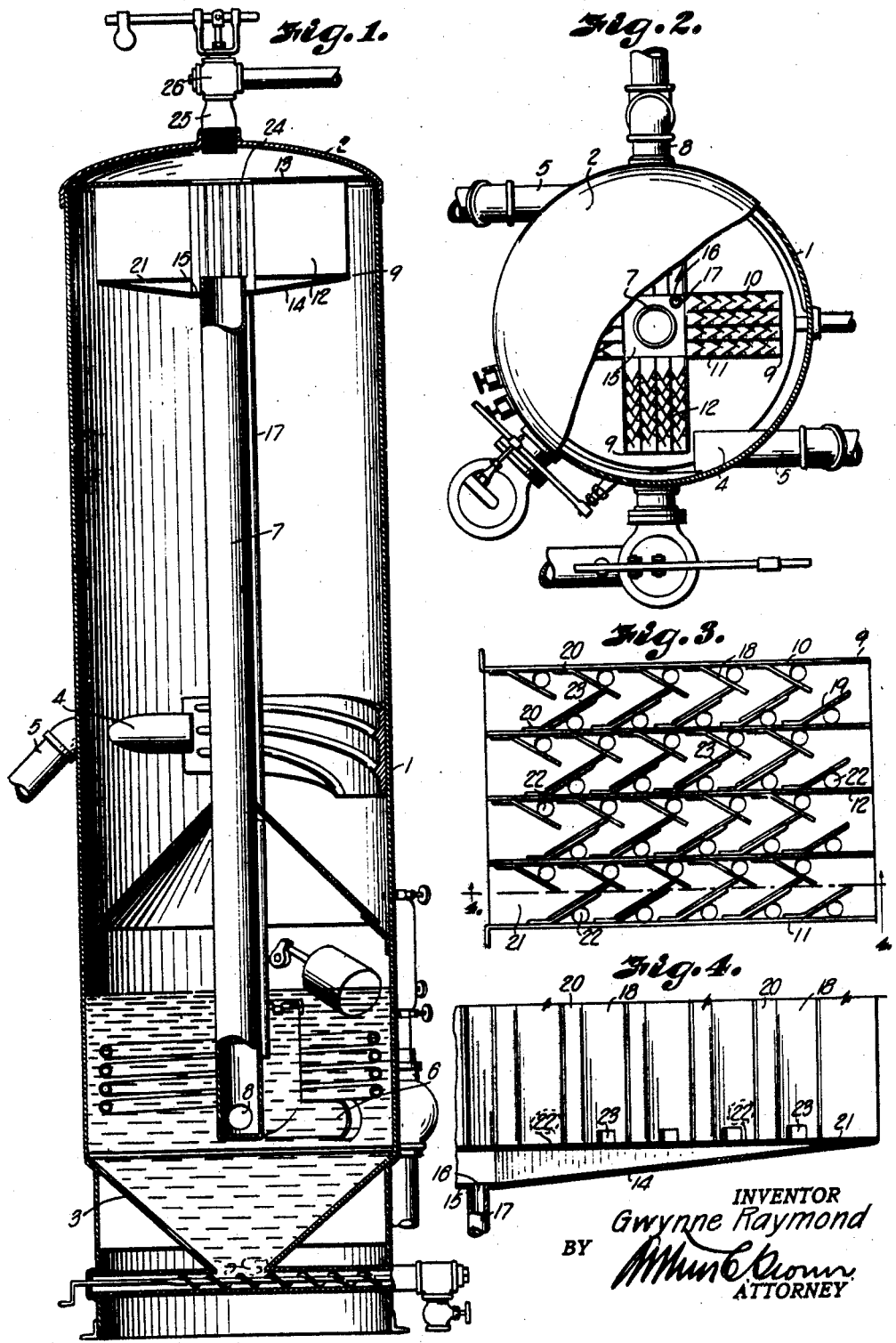
INVENTOR
Gwynne Raymond
BY
ATTORNEY Patented Dec. 1, 1931

1,834,180

UNITED STATES PATENT OFFICE

GWYNNE RAYMOND, OF KANSAS CITY, MISSOURI

SPRAY EXTRACTOR

Application filed December 9, 1929. Serial No. 412,817.

My invention relates to oil and gas separators and the like, and more particularly to spray extractors for removing liquid and solid particles from a stream of gas, the principal objects of the invention being to enhance the swirling or eddying motion of the gas stream, to provide areas of relative quiet in an extractor from which liquid and solid particles may depart, and to effect removal of liquid and solid particles without passing the same across the path of the gas stream.

In accomplishing these and other objects of the invention, I have provided improved details of structure, the preferred forms of which are illustrated in the accompanying drawings, wherein:

Fig. 1 is a vertical sectional view of an oil and gas separator equipped with a spray extractor embodying my invention.

Fig. 2 is a plan view of the separator, the cover and the top plate being broken away to better illustrate the extractor.

Fig. 3 is a plan view of a housing having tortuous passages for movement of liquid-laden gas toward the gas outlet of the separator.

Fig. 4 is a section of a housing on the line 4—4, Fig. 3.

Referring in detail to the drawings:

1 designates a tank or shell having a cover 2, a bottom 3 and side inlets 4. Tangential inlet couplings 5 are mounted in the inlet openings.

A mixture including gases, liquid and solids discharged into the shell is given a whirling motion due to the tangential inlets, and the liquid falls into the reservoir portion of the shell for flow through a valved outlet pipe 6.

The gas moving upwardly escapes through the upper intake end of a gas outlet pipe 7 mounted on the axis of the shell and having an outlet pipe branch 8 at its lower end extending through the wall of the shell.

Mounted on the upper end of the gas outlet pipe is a spray extractor comprising a plurality of rectangular box-like conduits or housings 9 extending horizontally radially in the shell and having outer gas-receiving ends spaced from the wall of the shell. The inner ends of the housings are spaced from the pipe 7 and are joined at their vertical edges to form an enclosure surrounding the upper end of the pipe.

Four housings are illustrated, each comprising vertical parallel walls including side walls 10 and 11 and partition walls 12 spaced to form a plurality of channels or passages for conducting gas toward the outlet pipe. Covers 13 on the several housings close the upper ends of the channels and sloping pans 14 inclined downwardly inwardly toward the gas outlet pipe form the bottoms of the housings, the covers and plates being attached as later described to form a unit supported by the tank.

The intake end of the gas outlet pipe extends upwardly into the nest of herringbone extractor housings sufficiently to form an area of quiet collection from the separated oil outside of and surrounding the pipe.

The pans 14 merge at their inner edges in a rectangular horizontal plate 15 mounted on the gas outlet pipe in sealing relation therewith, the upper end of the pipe projecting sufficiently above the same to prevent flow of oil from the pans into the outlet pipe. The plate thus forms an annular basin around the pipe to collect oil.

A drainage opening 16 is formed in the plate 15 and a drainage tube 17 is mounted in said opening for conducting liquid dripping from the pans back to the reservoir of the shell.

Arranged in each channel of each housing is a series of pairs of vertical ribs or herringbones 18 and 19 having flanges 20 fixed to the walls. The ribs extend forwardly from said walls in staggered relation to form tortuous passages for gas moving toward the gas outlet.

The ribs are arranged in the channels so that their free end edges extend substantially on the axes of the channels. The ribs in each pair are staggered to space the free ends thereof and provide ports for movement of gases therebetween, and extend at sharp angles forwardly.

The angular relation of the baffles to the horizontal planes of their upper and lower edges is also important, the chief consideration being that the upper ends thereof do not project farther down stream in the path of the gas streams than their lower ends. The baffles may slope to any desired extent in the opposite direction, or may be vertical as illustrated, to avoid formation of pockets in the upper ends of the housings, and promote flow of liquid downwardly over the surfaces.

The bottom end edges of the ribs are spaced suitably from the sloping pans 14 to permit flow of liquid over the pan bottoms toward the drainage outlet.

The lower or bottom ends of the ribs may extend to any desired distance toward the sloping drain plates or pans, and will be spaced therefrom sufficient to permit flow of liquid over the pans toward the basin. In the illustrated usage, however, the lower ends of the ribs are located in a plane, and partition plates 21 are fixed to said ends to form intermediate bottoms. Liquid outlet openings 22 are located in the narrow acute angular pockets formed by the ribs and walls of the housings, whereby liquid separated from the streams of gas may trickle over the ribs and bottom plates through the openings to the sloping pans.

In order to prevent liquid from flowing inwardly over the horizontal partitions toward the basin, when the bottom plates 21 are incorporated in the structure, narrow baffles or dams comprising bars or plates 23 are fixed to ribs 18 and extend across the spaces between adjacent ribs and in engagement with the partitions.

The side walls 10 and 11 of the several housings may comprise plates bent to form adjacent outer walls of adjacent housings, and the partitions are preferably welded to the top closures 13 whereby relatively inexpensive and sturdy structure is formed.

The housings are preferably constructed by welding the flanges of the ribs to the side walls and partition walls, assembling the several walls in inverted position on the covers, and welding the upper edges of the walls to the covers. In constructing the spray extractor as illustrated, the covers comprise portions of an integral plate on which the housing members are positioned and to which they are welded.

The plate has a cirfumferential rim or edge portion extending outwardly from the housings and adapted to be welded to the tank cover 2 supported thereby, thus preventing upward flow of gases past the housings into the top portion of the tank. The plate has a central opening 24 conforming to the contour of the inner edges of the assembled housings, and affording access for extracted gas to the top portion of the tank.

The cover 2 is provided with an opening in which a nipple 25 is mounted for connection with a flow line and providing an additional outlet for gas. A safety valve 26 on the nipple is subject to pressure of gas in the top portion of the tank.

The sloping pans are welded to the side walls of the housings. The outer end portions of the pans are welded to the lower edges of the side walls and portions, and the inner ends are attached to the plate forming the bottom of the annular basin. When the horizontal partitions are used, they are welded to the housings before the sloping pans are installed.

In operating apparatus constructed as described, a stream of gas laden with droplets of oil passing upwardly in the separator and moving with a whirling motion, is divided into a number of streams for passage into the outer inlet ends of the several housings. The several streams are again divided by the partitions in the housings, and each smaller stream portions move with a whirling, swirling or eddying motion, being turned into several directions and being turned many times into opposite directions before arriving at the annular chamber around the outlet pipe.

Narrow sharp angled pockets of comparative quiet receive the gas streams at the outer limit of the swirling path so that small particles of liquid and solids whirled outwardly by the centrifugal effect of the stream of movement will tend to lodge in the pockets and droplets will trickle or flow down the faces of the steel ribs, solids being washed downwardly thereby.

The delivery of the drops to areas of the ribs and housing walls remote from the passages between the pairs of ribs thus remove the droplets effectually from the stream of gas so that liquid particles are not required to move across the path through which the gases travel.

The gases therefore do not have opportunity to recapture droplets and the liquid is isolated and returned to the reservoir without passing across the paths of gases.

The streams of gases moving from the housings tend to move to the intake of the gas outlet pipe without contact with the bottom of the basin, and an area of quiet collection for the separated oil is thus afforded, outside of and surrounding the upper end of the central gas pipe.

Attention is called to the fact that the extractor is located in substantially spaced relation with the inlet of the shell whereby a relatively large open space is afforded for the centrifugal extraction of the bulk of oil from gas and relatively liquid-free gas will move into the extractor housings.

What I claim and desire to secure by Letters Patent is:

1. In apparatus of the character described including a tank and a gas outlet pipe having an open upper end extending vertically in the tank, a spray extractor including a horizontal plate sealingly engaged with the pipe adjacent the upper end thereof and a series of horizontal conduits arranged around the upper end of the pipe having sloping bottoms connected with the plate.

2. In apparatus of the character described including a tank and a gas outlet pipe having an open upper end extending vertically in the tank, a series of horizontal conduits arranged around the upper end of the pipe for flow of gas therethrough from the tank to the pipe, and means provided with an oil outlet sealing the inner ends of the conduits from the space in the tank below the conduits.

3. In apparatus of the character described including a tank and a gas outlet pipe having an intake end in the tank, a series of housings having outer ends communicating with the tank and inner ends spaced from the pipe, said inner ends being interconnected to form a continuous annular series of gas discharge ports around the intake end of the pipe, and a plate sealingly engaged with the pipe and connected with the housings to receive liquid flowing from the housings, said plate being provided with a drainage outlet.

4. In apparatus of the character described including a tank and a vertical gas outlet pipe in the tank having an intake end adjacent one end of the tank, a spray extractor comprising a series of sets of radial vertical plates arranged around the intake end of said pipe forming a series of housings, each having a plurality of channels, a cover plate fixed to the tank and to the upper edges of the plates closing the upper ends of the channels and supporting the housings, a sloping pan extending below each housing, and sealingly connected with the pipe.

5. In apparatus of the character described including a tank and a gas outlet pipe having an intake end located within the tank, a spray extractor supported by the tank around the intake end of the pipe including a series of radially arranged housings including radial vertical side wall plates, the plates forming the side walls of each housing being integral with the plates forming the adjacent side walls of adjacent housings.

6. In a spray extractor, a housing including parallel vertical walls spaced to form a channel, a cover closing the upper end of the channel, a pair of vertical ribs fixed to the walls in the channel having inner ends spaced to form a passage therebetween for flow of gas through the housing, a horizontal plate having drainage openings fixed to the lower edges of the walls to close the lower end of the channel, and a dam engaging the plate and spanning said passage to prevent flow of liquid over the plate through the housing.

7. In an apparatus of the character described including a tank, an outlet pipe extending vertically of the tank and having an open upper end, a spray extractor supported in the tank above the end of the pipe and communicating therewith, a collector member encircling the pipe below the extractor for receiving liquid draining from the extractor, and an outlet pipe for removing the liquid from the collector member and delivering it to the bottom of the tank.

8. In an apparatus of the character described including a tank, an outlet pipe extending vertically of the tank and having an open upper end, a spray extractor supported in the tank above the end of the pipe and communicating therewith, a collector member sealingly engaged with the pipe below the extractor for receiving liquid draining from the extractor, and an outlet pipe for removing liquid from the collector member and delivering it to the bottom of the tank.

In testimony whereof I affix my signature.
GWYNNE RAYMOND.